United States Patent
Li et al.

(10) Patent No.: US 12,020,208 B1
(45) Date of Patent: Jun. 25, 2024

(54) DYNAMICALLY INTEGRATING NODES INTO A COLLABORATE NETWORK

(71) Applicant: International Business Machines Corporation, Armonk, NY (US)

(72) Inventors: Qi Li, Beijing (CN); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/207,991

(22) Filed: Jun. 9, 2023

(51) Int. Cl.
*H04L 41/14* (2022.01)
*G06Q 10/101* (2023.01)
*H04L 67/10* (2022.01)

(52) U.S. Cl.
CPC ......... *G06Q 10/101* (2013.01); *H04L 41/145* (2013.01); *H04L 67/10* (2013.01)

(58) Field of Classification Search
CPC .............................. G06Q 10/101; H04L 41/145
See application file for complete search history.

(56) References Cited

U.S. PATENT DOCUMENTS

| | | | |
|---|---|---|---|
| 8,627,210 B2 | 1/2014 | Vijayakumar et al. | |
| 8,713,143 B2* | 4/2014 | Centola | G06Q 50/01 709/204 |
| 10,586,215 B2 | 3/2020 | Narayanan et al. | |
| 10,922,282 B2* | 2/2021 | Jalagam | G06F 16/288 |
| 2014/0075318 A1* | 3/2014 | Cheng | H04L 41/22 715/735 |
| 2014/0172729 A1* | 6/2014 | Chakraborty | G06Q 10/06 705/319 |

(Continued)

FOREIGN PATENT DOCUMENTS

| | | |
|---|---|---|
| CN | 106161204 A | 11/2016 |
| CN | 107705212 B | 6/2021 |

OTHER PUBLICATIONS

Kas et al., Incremental Algorithm for Updating Betweenness Centrality in Dynamically Growing Networks, 2013 IEEE/ACM International Conference on Advances in Social Networks Analysis and Mining (ASONAM 2013), Aug. 25-28, 2013.

(Continued)

*Primary Examiner* — Daniel Rodriguez
(74) *Attorney, Agent, or Firm* — Garg Law Firm, PLLC; Rakesh Garg; Michael O'Keefe

(57) ABSTRACT

Using data of a plurality of interactions within a collaborative network, a collaborative network graph is constructed. Each node in the collaborative network graph represents a participant in an interaction, and each edge in the collaborative network graph represents an interaction between participants represented by corresponding nodes. Using a plurality of stochastic simulations of changes to the collaborative network graph, integration of a new node into the collaborative network is simulated. A simulation in the plurality of stochastic simulations producing a largest score improvement between scores computed on the collaborative network graph is selected as a best simulation. Using a plurality of changes to the collaborative network graph included in the best simulation, an integration recommendation is constructed, in which a portion of the integration recommendation corresponds to a change in the plurality of changes.

20 Claims, 7 Drawing Sheets

(56) References Cited

U.S. PATENT DOCUMENTS

| | | | | |
|---|---|---|---|---|
| 2015/0082448 A1* | 3/2015 | Elovici | ................ | G06Q 10/107 |
| | | | | 726/26 |
| 2015/0324482 A1* | 11/2015 | Kato | .................... | H04L 41/145 |
| | | | | 707/798 |
| 2018/0115603 A1* | 4/2018 | Hu | ......................... | G06Q 50/01 |
| 2019/0108240 A1* | 4/2019 | Jalagam | .............. | G06F 16/9024 |
| 2020/0067936 A1* | 2/2020 | Ojha | ....................... | H04L 67/55 |

OTHER PUBLICATIONS

Johnstone, A Risk Based Approach to Node Insertion within Social Networks, Mar. 26, 2015.
Cai et al., Discrete particle swarm optimization for identifying community structures in signed social networks, Oct. 2014.
Cai et al., Greedy discrete particle swarm optimization for large-scale social network clustering, Sep. 25, 2014.
Chen et al., A link prediction algorithm based on ant colony optimization, Jul. 2, 2014.
Nasuto et al., Steady State Resource Allocation Analysis of the Stochastic Diffusion Search, Feb. 7, 2002.

\* cited by examiner

US 12,020,208 B1

DYNAMICALLY INTEGRATING NODES INTO A COLLABORATE NETWORK

BACKGROUND

The present invention relates generally to a method, system, and computer program product for collaborative network management. More particularly, the present invention relates to a method, system, and computer program product for dynamically integrating nodes into a collaborate network.

A collaborative network is a network including entities (e.g., organizations or people) that collaborate to achieve a common or compatible goal, and whose interactions occur over a computer network. The entities are also referred to as network participants or collaborators, and are represented by nodes within the collaborative network. Edges connecting nodes within the collaborative network represent communications or interactions between network participants. A collaborative network can be implemented using, for example, a social media website, a collaboration website, text messages, electronic mail messages, a software application that communicates with another instance of the software application, another application, or a website, or using another implementation or combination of implementations. One example of users of a collaborative network is a workplace project team, in which participants use the network to collaborate on a particular project.

SUMMARY

The illustrative embodiments provide a method, system, and computer program product. An embodiment includes a method that constructs, using data of a plurality of interactions within a collaborative network, a collaborative network graph, wherein each node in the collaborative network graph represents a participant in an interaction in the plurality of interactions, wherein each edge in the collaborative network graph represents an interaction between participants represented by corresponding nodes. An embodiment simulates, using a plurality of stochastic simulations of changes to the collaborative network graph, integration of a new node into the collaborative network. An embodiment selects, as a best simulation, a simulation in the plurality of stochastic simulations producing a largest score improvement between a first score computed on the collaborative network graph and a second score computed on a second state of the collaborative network graph, the second state resulting from the simulation. An embodiment constructs, using a plurality of changes to the collaborative network graph included in the best simulation, an integration recommendation, a portion of the integration recommendation corresponding to a change in the plurality of changes.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
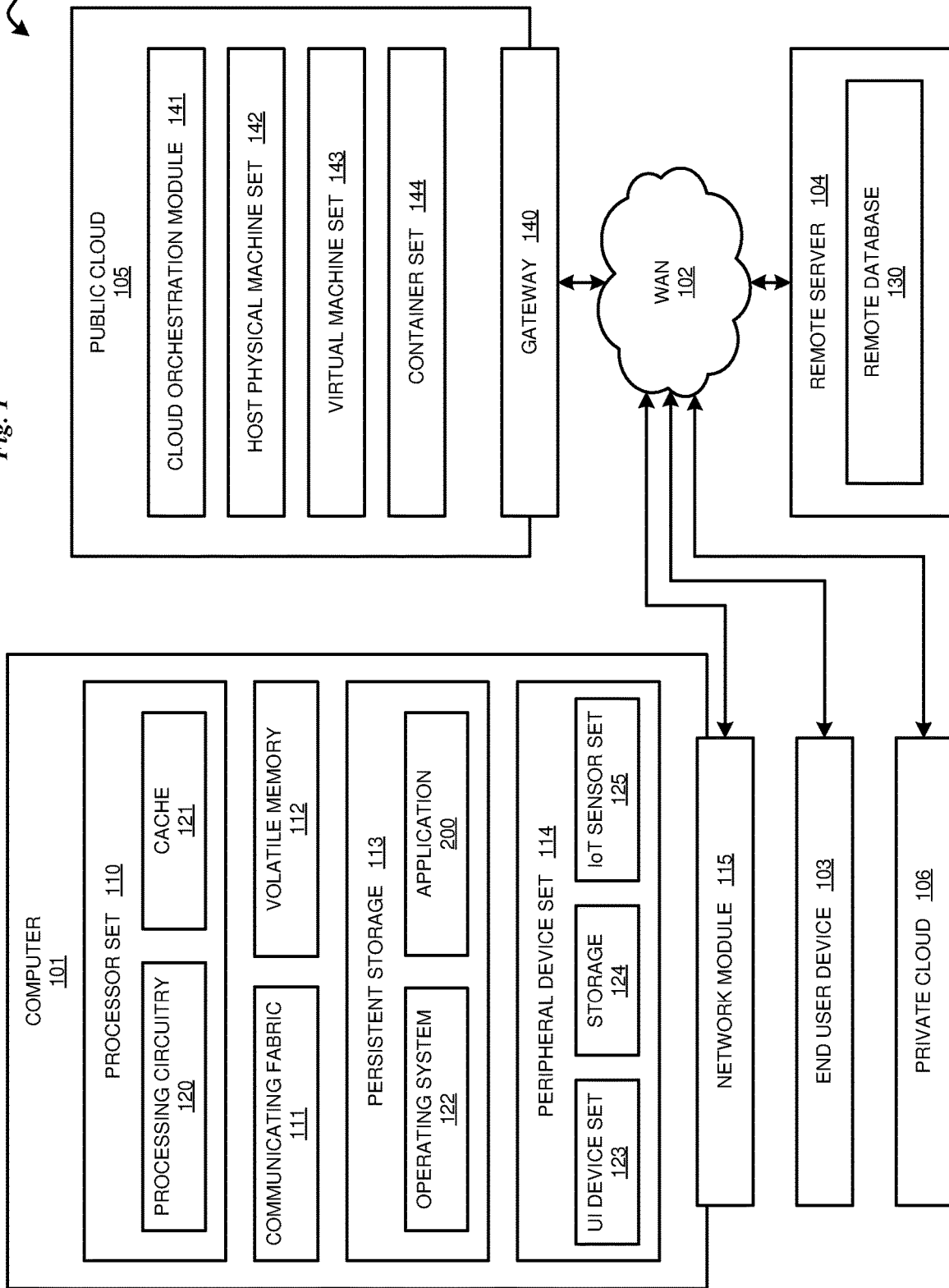
FIG. 1 depicts an example diagram of a data processing environments in which illustrative embodiments may be implemented.

The illustrative embodiments recognize that, when a new user joins an existing collaborative network, there is an integration period in which patterns and behaviors within the network often change as the new user integrates into the network. The network, as a whole, will be most efficient when the new user is effectively integrated, and thus, performing the integration as efficiently as possible is desired. Centralized control systems that use control theory to monitor and orchestrate a collaborative network (e.g., to recommend groups for a user based on the user's communications) have been described. However, such centralized approaches are typically not evaluated for speed or efficiency, and thus there is a need for an improved approach to integrate a new user into a collaborative network.

The illustrative embodiments recognize that the presently available tools or solutions do not address these needs or provide adequate solutions for these needs. The illustrative embodiments used to describe the invention generally address and solve the above-described problems and other problems related to dynamically integrating nodes into a collaborate network.

An embodiment can be implemented as a software application. The application implementing an embodiment can be configured as a modification of an existing collaborative network management system, as a separate application that operates in conjunction with an existing collaborative network management system, a standalone application, or some combination thereof.

Particularly, some illustrative embodiments provide a method that constructs a collaborative network graph, uses a plurality of stochastic simulations of changes to the collaborative network graph to simulate integration of a new node into the collaborative network, and uses a plurality of changes to the collaborative network graph included in the best simulation to construct an integration recommendation.

An embodiment receives data of interactions within a collaborative network. Non-limiting examples of data of interactions within a collaborative network are the contents of interactions among participants in the network and metadata of the interactions among participants in the network (e.g., a timestamp, format, email address, telephone number, and the like, associated with an interaction), and user profile data of one or more users of the collaborative network. Non-limiting examples of user profile data are contact information for a user, a user's geographical location, a user's interests or hobbies, and (in a workplace implementation) a user's job skills, completed training courses, previous project(s), manager, direct report(s), performance reviews, and the like.

An embodiment uses data of interactions within a collaborative network to construct a collaborative network graph. In the graph, each node represents a participant in an interaction, and each edge represents an interaction between participants represented by corresponding nodes. For example, if data of interactions within a collaborative network includes an interaction between users Paul and Helen, the graph might include an edge (representing the interaction) connecting a node representing Paul and a node representing Helen. An embodiment weights nodes and edges within the graph according to a predefined weighting scheme. In one non-limiting example of a predefined weighting scheme, the weights are numbers, and a node is weighted according to a quantitative measure of influence of the user represented by the node. Thus, if Helen is a manager with six direct reports, the weight of the node representing Helen might be six. In another non-limiting example of a predefined weighting scheme, the weights are numbers, and a node is weighted according to the eminence score of the user represented by the node. Thus, if John is an expert on the C computer language, and ten people routinely consult John on aspects of C, the weight of the node representing John might be ten. In another non-limiting example of a predefined weighting scheme, the weights are numbers, and a node is weighted according to a seniority score (computed according to a user's career seniority, seniority within a workplace or the collaborative network, amount of experience with a particular subject area or task, or a combination of one or more of these factors) of the user represented by the node. In another non-limiting example of a predefined weighting scheme, the weights are numbers, and an edge is weighted according to a combination of the number and quality (as measured by a quantitative quality measure) of the interactions of users represented by the nodes connecting the edge. In another non-limiting example of a predefined weighting scheme, the weights are coordinates in a multi-dimensional space, selected so that nodes representing more influential users are placed closer to a central point in the multi-dimensional space and nodes representing less influential users are placed further from the central point. In another non-limiting example of a predefined weighting scheme, the weights are coordinates in a multi-dimensional space, selected so that the length of an edge is inversely proportional to the edge's weight and edges are weighted according to a combination of the number and quality (as measured by a quantitative quality measure) of the interactions of users represented by the nodes connecting the edge. Other weighting schemes, and combinations of schemes, are also possible and contemplated within the scope of the illustrative embodiments. Techniques to analyze data of interactions within a collaborative network, including natural language processing techniques to analyze natural language and other data analysis techniques to analyze structured data and metadata, are presently available. Techniques to construct a collaborative network graph from data of interactions within a collaborative network are also presently available.

An embodiment uses a plurality of stochastic simulations of changes within the collaborative network graph to simulate integration of a new node (representing a new user or participant) into the collaborative network. A stochastic simulation is a simulation of a system in which variables can change randomly, or stochastically, with individual probabilities. In particular, an embodiment adds a new node, representing the new user, to the graph. An embodiment selects a starting weight of the new node, and the starting existence and weight of a new edge connecting the new node to another node. In one embodiment, one or more of the starting weight of the new node, the starting existence and weight of a new edge, and the existing node connected to the new edge have predefined values. Another embodiment randomly selects one or more of the starting weight of the new node, the starting existence and weight of a new edge, and the existing node connected to the new edge. The new edge represents a simulated interaction or communication flow between the new user and an existing member of the collaborative network represented by the graph. To perform random selection, an embodiment uses a presently available pseudorandom number generator technique. An embodiment uses a presently available graph analysis technique to compute a score of the starting state of the graph. The score is a measure of the structural integrity of the graph. Structural integrity relates to both the weight of the nodes and the presence of a bounded two way connections between nodes. Some non-limiting examples of presently available graph analysis techniques are bridge analysis, centrality analysis, density analysis, tie strength analysis, cohesion analysis, and cluster coefficient analysis.

An embodiment simulates randomly selected changes in the graph, including the new node being integrated, over time. To simulate randomly selected changes in the graph, an embodiment uses one or more presently available swarm analysis techniques, such as diffusion, search, colony optimization, particle optimization, and routing simulation. A swarm analysis technique is used as a stochastic simulation technique to model the operational workflow within a graph, including simulate information flow around nodes of the collaborative network graph, consequential changes to node or edge weights within the graph, and the network's integrity, helping an embodiment infer areas of strength and weakness in the overall structure. At a simulation end point, an embodiment uses the same graph analysis technique as was used to compute a score of the starting state of the graph to compute a score of the ending state of the graph. An embodiment also determines skillsets of existing nodes in the network graph compared to a skillset of a new edge node. In one embodiment, users collect skills badges, or other indications of accomplishment, by completing specific courses or trainings or from demonstration of a skill (e.g., by using the skill on a project). Skills badges are incorporated into the profiles of users represented by nodes in the graph.

An embodiment selects, as the best simulation, the simulation that produced the greatest score improvement between a first score computed on the original state of the collaborative network graph and a second score computed on a state of the collaborative network graph resulting from the simulation. An embodiment uses the simulated changes in the selected best simulation to construct an integration recommendation for integrating the new user into the collaborative network. In the integration recommendation, a portion, step, or phase corresponds to a simulated change in the best simulation.

One embodiment implements a step in a recommendation for integrating the new user into the collaborative network by adding a graph edge (representing a communication link) between a node representing the new user and an existing node of the collaborative network graph. For example, the added graph edge might represent a mentor-mentee relationship between the new and existing users, or represent an addition of the new user to a specific subset of the collaborative network (such as a project team or affinity group). Another embodiment implements a step in a recommendation for integrating the new user into the collaborative network by adjusting a weight of the new node within the collaborative network graph. For example, an increased node weight might represent an increase of a skillset of a participant represented by the node (e.g., through a training course, project, or other method of skillset upgrading). Another embodiment implements a step in a recommendation for integrating the new user into the collaborative network by adjusting a weight of an edge connecting the new node and an existing node within the collaborative network graph. For example, an edge weight adjustment might reflect an adjustment in communications between the new user and existing users, as the new user becomes more tightly integrated into an already-existing team. Another embodiment supplies one or more recommendation steps to a human expert, such as a manager, Human Resources specialist, or team leader, for implementation.

The manner of dynamically integrating nodes into a collaborate network described herein is unavailable in the presently available methods in the technological field of endeavor pertaining to collaborative network management. A method of an embodiment described herein, when implemented to execute on a device or data processing system, comprises substantial advancement of the functionality of that device or data processing system in constructing a collaborative network graph, using a plurality of stochastic simulations of changes to the collaborative network graph to simulate integration of a new node into the collaborative network, and using a plurality of changes to the collaborative network graph included in the best simulation to construct an integration recommendation.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200. Application 200 implements an embodiment that dynamically integrates nodes into a collaborate network as described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
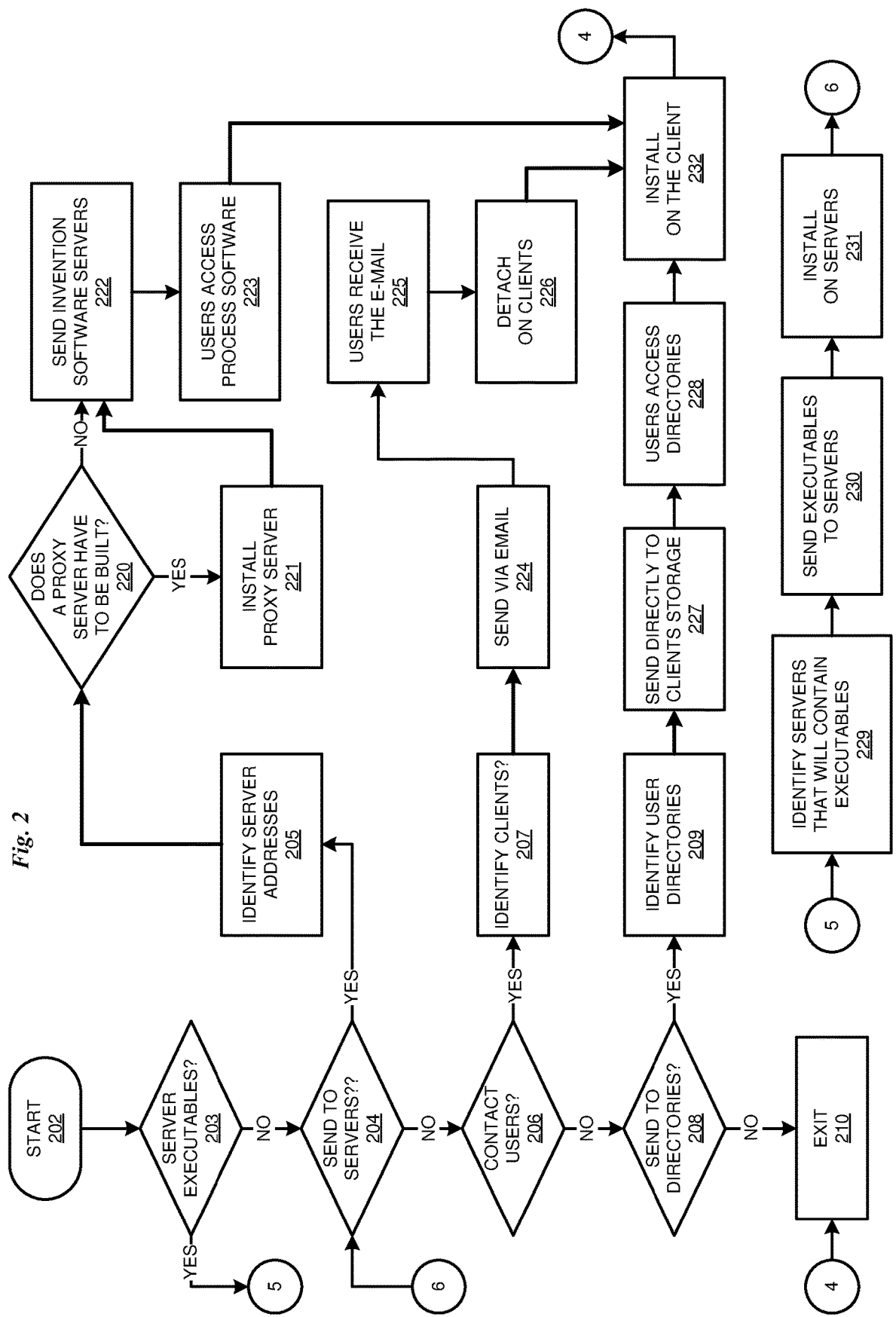
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software such as application 200 may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
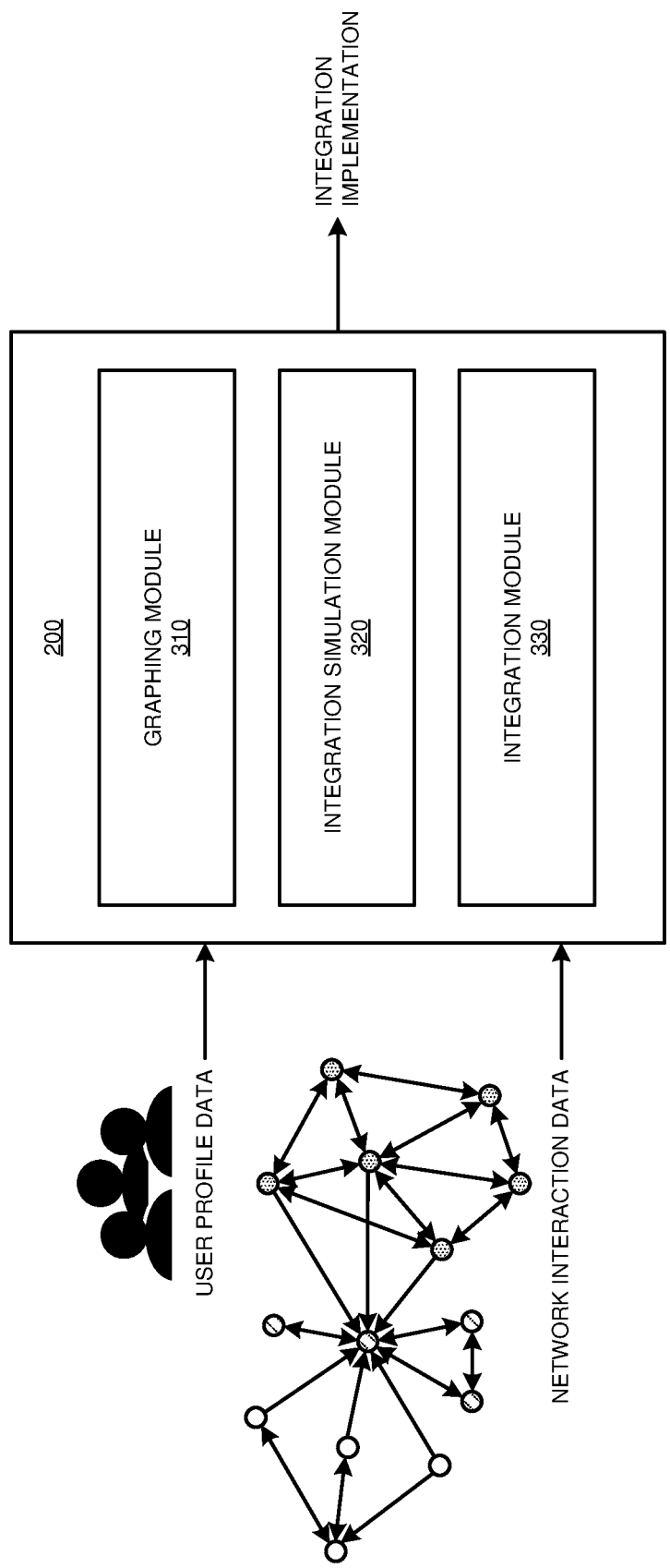
FIG. 3 depicts a block diagram of an example configuration for dynamically integrating nodes into a collaborate network in accordance with an illustrative embodiment.

With reference to FIG. 3, this figure depicts a block diagram of an example configuration for dynamically integrating nodes into a collaborate network in accordance with an illustrative embodiment. Application 300 is the same as application 200 in FIG. 1.

Graphing module 310 receives data of interactions within a collaborative network. Non-limiting examples of data of interactions within a collaborative network are the contents of interactions among participants in the network and metadata of the interactions among participants in the network (e.g., a timestamp, format, email address, telephone number, and the like, associated with an interaction), and user profile data of one or more users of the collaborative network. Non-limiting examples of user profile data are contact information for a user, a user's geographical location, a user's interests or hobbies, and (in a workplace implementation) a user's job skills, completed training courses, previous project(s), manager, direct report(s), performance reviews, and the like.

Module 310 uses data of interactions within a collaborative network to construct a collaborative network graph. In the graph, each node represents a participant in an interaction, and each edge represents an interaction between participants represented by corresponding nodes. For example, if data of interactions within a collaborative network includes an interaction between users Paul and Helen, the graph might include an edge (representing the interaction) connecting a node representing Paul and a node representing Helen. Module 310 weights nodes and edges within the graph according to a predefined weighting scheme. In one non-limiting example of a predefined weighting scheme, the weights are numbers, and a node is weighted according to a quantitative measure of influence of the user represented by the node. Thus, if Helen is a manager with six direct reports, the weight of the node representing Helen might be six. In another non-limiting example of a predefined weighting scheme, the weights are numbers, and a node is weighted according to the eminence score of the user represented by the node. Thus, if John is an expert on the C computer language, and ten people routinely consult John on aspects of C, the weight of the node representing John might be ten. In another non-limiting example of a predefined weighting scheme, the weights are numbers, and a node is weighted according to a seniority score (computed according to a user's career seniority, seniority within a workplace or the collaborative network, amount of experience with a particular subject area or task, or a combination of one or more of these factors) of the user represented by the node. In another non-limiting example of a predefined weighting scheme, the weights are numbers, and an edge is weighted according to a combination of the number and quality (as measured by a quantitative quality measure) of the interactions of users represented by the nodes connecting the edge. In another non-limiting example of a predefined weighting scheme, the weights are coordinates in a multi-dimensional space, selected so that nodes representing more influential users are placed closer to a central point in the multi-dimensional space and nodes representing less influential users are placed further from the central point. In another non-limiting example of a predefined weighting scheme, the weights are coordinates in a multi-dimensional space, selected so that the length of an edge is inversely proportional to the edge's weight and edges are weighted according to a combination of the number and quality (as measured by a quantitative quality measure) of the interactions of users represented by the nodes connecting the edge. Other weighting schemes, and combinations of schemes, are also possible. Techniques to analyze data of interactions within a collaborative network, including natural language processing techniques to analyze natural language and other data analysis techniques to analyze structured data and metadata, are presently available. Techniques to construct a collaborative network graph from data of interactions within a collaborative network are also presently available.

Integration simulation module 320 uses a plurality of stochastic simulations of changes within the collaborative network graph to simulate integration of a new node (representing a new user or participant) into the collaborative network. A stochastic simulation is a simulation of a system in which variables can change randomly, or stochastically, with individual probabilities. In particular, module 320 adds a new node, representing the new user, to the graph. Module 320 selects a starting weight of the new node, and the starting existence and weight of a new edge connecting the new node to another node. In one implementation of module 320, one or more of the starting weight of the new node, the starting existence and weight of a new edge, and the existing node connected to the new edge have predefined values. Another implementation of module 320 randomly selects one or more of the starting weight of the new node, the starting existence and weight of a new edge, and the existing node connected to the new edge. The new edge represents a simulated interaction or communication flow between the new user and an existing member of the collaborative network represented by the graph. To perform random selection, module 320 uses a presently available pseudorandom number generator technique. Module 320 uses a presently available graph analysis technique to compute a score of the starting state of the graph. The score is a measure of the structural integrity of the graph. Some non-limiting examples of presently available graph analysis techniques are bridge analysis, centrality analysis, density analysis, tie strength analysis, cohesion analysis, and cluster coefficient analysis.

Module 320 simulates randomly selected changes in the graph, including the new node being integrated, over time. To simulate randomly selected changes in the graph, module 320 uses one or more presently available swarm analysis techniques, such as diffusion, search, colony optimization, particle optimization, and routing simulation. The swarm analysis techniques simulate information flow around nodes of the collaborative network graph and consequential changes to node or edge weights within the graph. At a simulation end point, module 320 uses the same graph analysis technique as was used to compute a score of the starting state of the graph to compute a score of the ending state of the graph. Module 320 also determines skillsets of existing nodes in the network graph compared to a skillset of a new edge node.

Integration module 330 selects, as the best simulation, the simulation that produced the greatest score improvement between a first score computed on the original state of the collaborative network graph and a second score computed on a state of the collaborative network graph resulting from the simulation. Module 330 uses the simulated changes in the selected best simulation to construct an integration recommendation for integrating the new user into the collaborative network. In the integration recommendation, a portion, step, or phase corresponds to a simulated change in the best simulation.

One implementation of module 330 implements a step in a recommendation for integrating the new user into the collaborative network by adding a graph edge (representing a communication link) between a node representing the new user and an existing node of the collaborative network graph. For example, the added graph edge might represent a mentor-mentee relationship between the new and existing users, or represent an addition of the new user to a specific subset of the collaborative network (such as a project team or affinity group). Another implementation of module 330 implements a step in a recommendation for integrating the new user into the collaborative network by adjusting a weight of the new node within the collaborative network graph. For example, an increased node weight might represent an increase of a skillset of a participant represented by the node (e.g., through a training course, project, or other method of skillset upgrading). Another implementation of module 330 implements a step in a recommendation for integrating the new user into the collaborative network by adjusting a weight of an edge connecting the new node and an existing node within the collaborative network graph. For example, an edge weight adjustment might reflect an adjustment in communications between the new user and existing users, as the new user becomes more tightly integrated into an already-existing team. Another implementation of module 330 supplies one or more recommendation steps to a human expert, such as a manager, Human Resources specialist, or team leader, for implementation.

Figure 4:
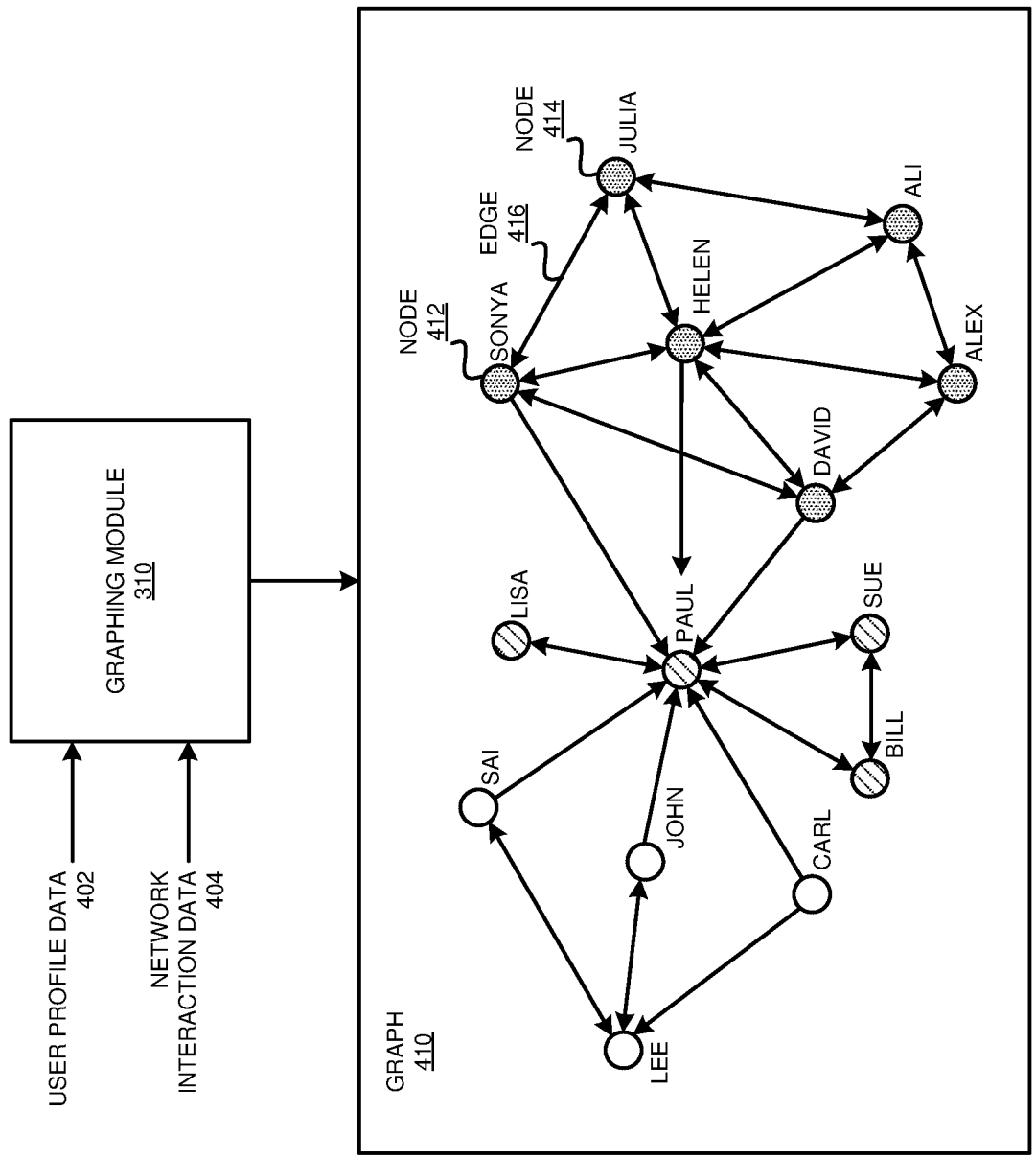
FIG. 4 depicts an example of dynamically integrating nodes into a collaborate network in accordance with an illustrative embodiment.

With reference to FIG. 4, this figure depicts an example of dynamically integrating nodes into a collaborate network in accordance with an illustrative embodiment. The example can be executed using application 300 in FIG. 3. Graphing module 310 is the same as graphing module 310 in FIG. 3.

As depicted, graphing module 310 receives data of interactions within a collaborative network, including user profile data 402 and network interaction data 404, and uses data 402 and 404 to construct a collaborative network graph 410. Within graph 410, each node (e.g., nodes 412 and 414) represents a participant in an interaction, and each edge (e.g., edge 416) represents an interaction between participants represented by corresponding nodes.

Figure 5:
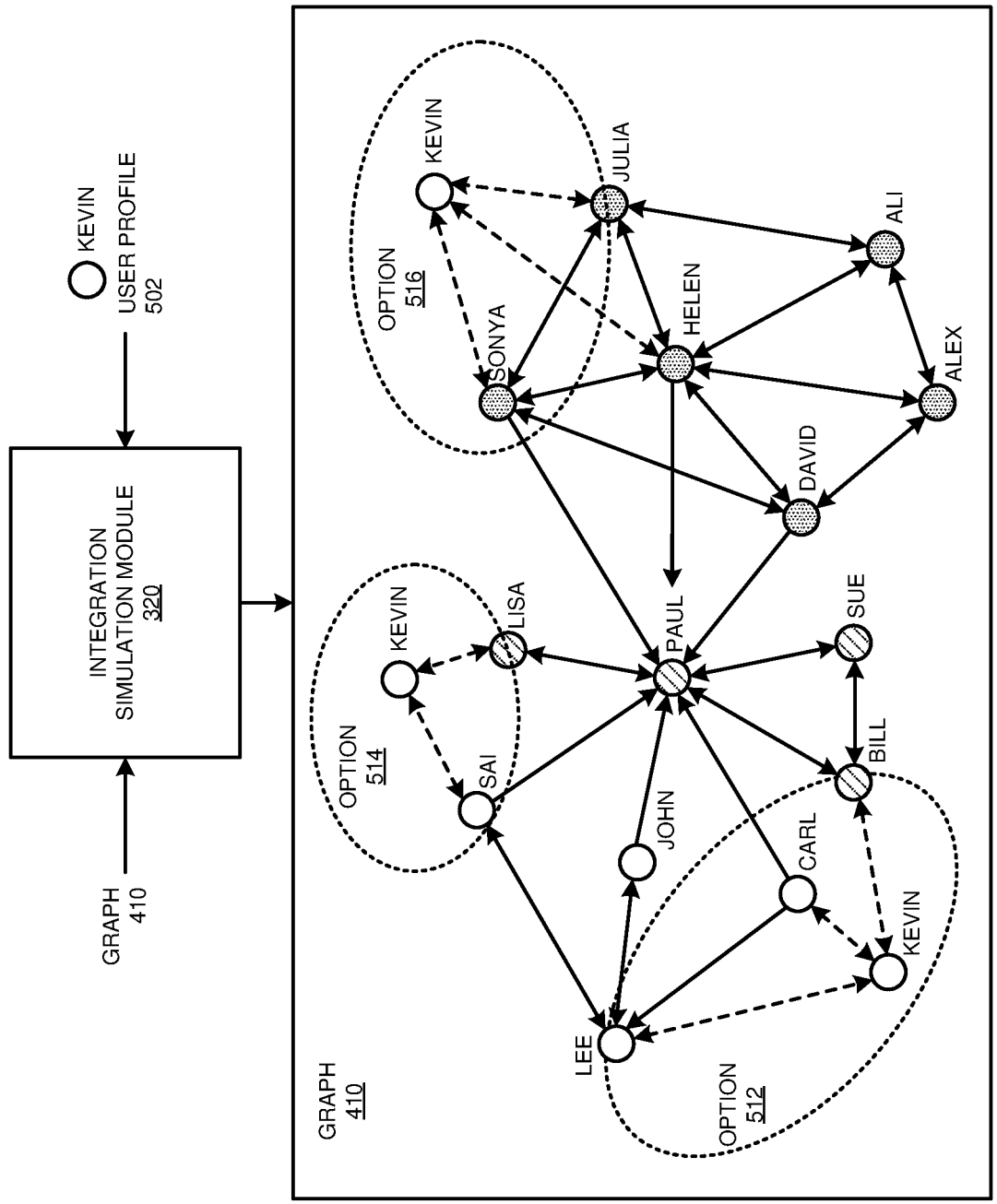
FIG. 5 depicts a continued example of dynamically integrating nodes into a collaborate network in accordance with an illustrative embodiment.

With reference to FIG. 5, this figure depicts a continued example of dynamically integrating nodes into a collaborate network in accordance with an illustrative embodiment. Integration simulation module 320 is the same as integration simulation module 320 in FIG. 3. Graph 410 is the same as graph 410 in FIG. 4.

As depicted, integration simulation module 320 uses a plurality of stochastic simulations of changes within graph 410 to simulate integration of a new node (representing the new user described in user profile 502) into the collaborative network. Options 512, 514, and 516 depict possible results of the simulation.

Figure 6:
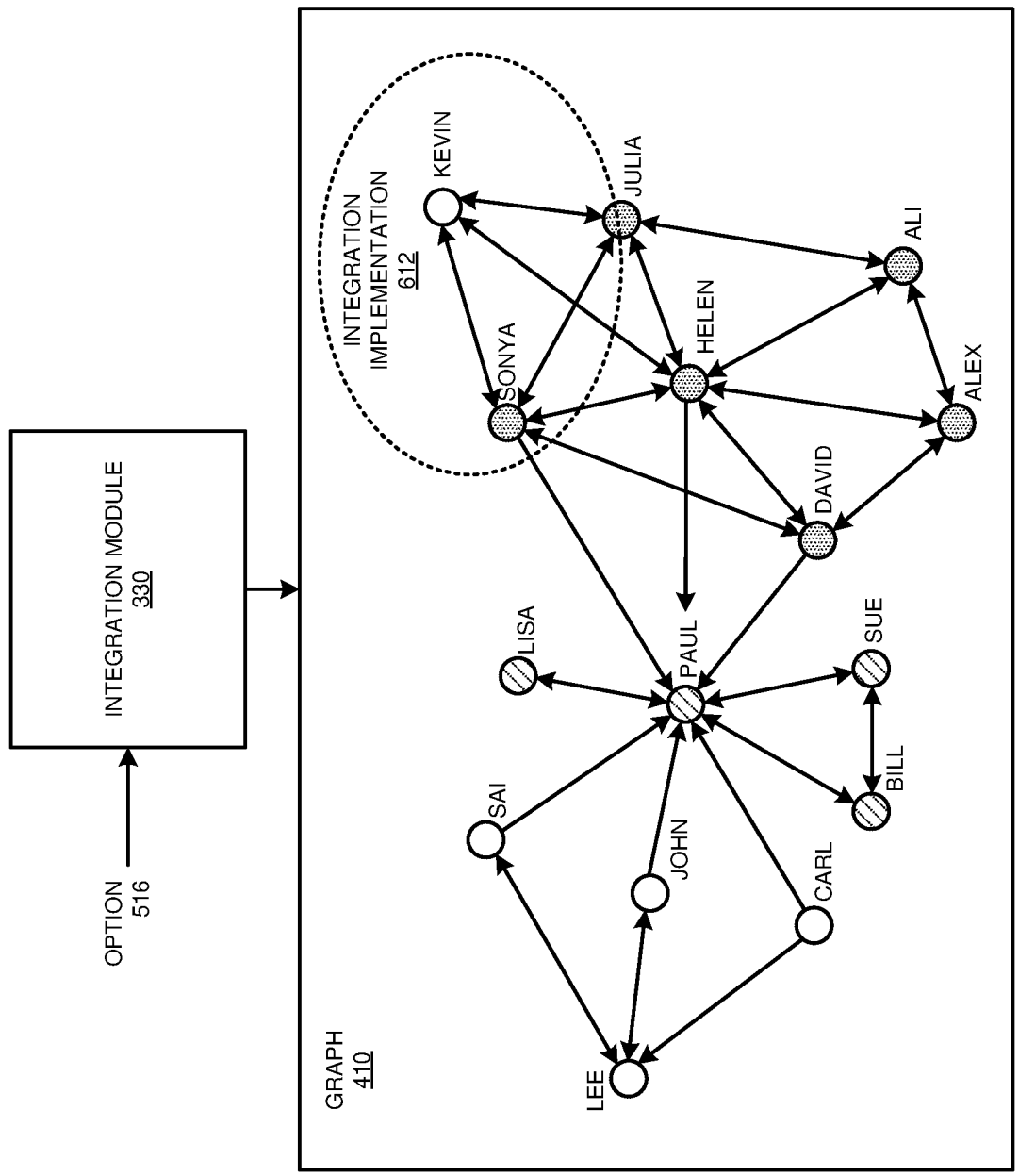
FIG. 6 depicts a continued example of dynamically integrating nodes into a collaborate network in accordance with an illustrative embodiment.

With reference to FIG. 6, this figure depicts a continued example of dynamically integrating nodes into a collaborate network in accordance with an illustrative embodiment. Integration module 330 is the same as integration module 330 in FIG. 3. Graph 410 is the same as graph 410 in FIG. 4. Option 516 is the same as option 516 in FIG. 5.

Here, integration module 330 selects option 516 as the best simulation, the simulation that produced the greatest score improvement between a first score computed on the original state of the graph 410 and a second score computed on a state of graph 410 resulting from the simulation. Module 330 implements option 516 with integration implementation 612, adding a new node representing Kevin and new edges connecting the new node to existing nodes in graph 410.

Figure 7:
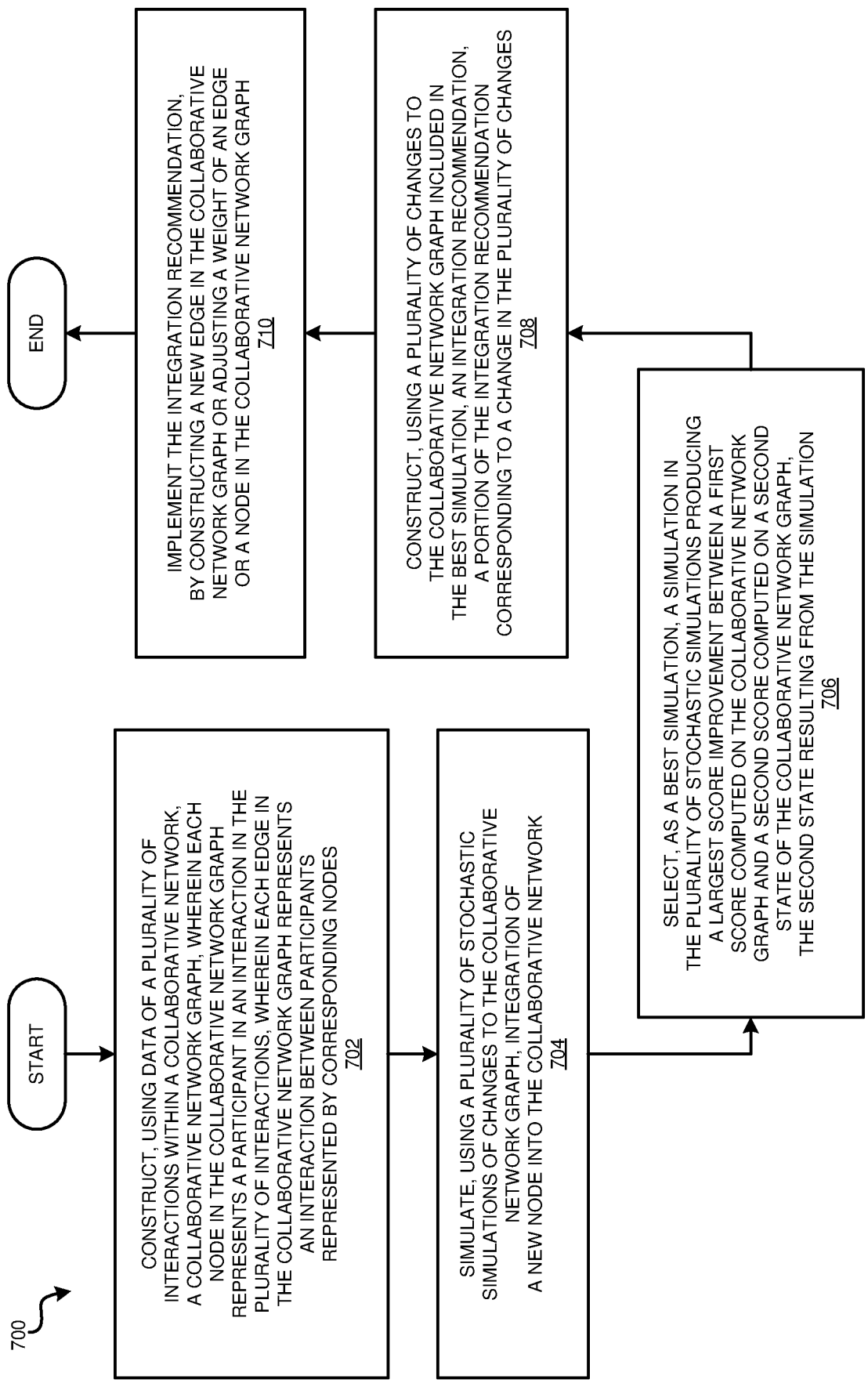
FIG. 7 depicts a flowchart of an example process for dynamically integrating nodes into a collaborate network in accordance with an illustrative embodiment.

With reference to FIG. 7, this figure depicts a flowchart of an example process for dynamically integrating nodes into a collaborate network in accordance with an illustrative embodiment. Process 700 can be implemented in application 300 in FIG. 3.

In block 702, the process constructs, using data of a plurality of interactions within a collaborative network, a collaborative network graph, wherein each node in the collaborative network graph represents a participant in an interaction in the plurality of interactions, wherein each edge in the collaborative network graph represents an interaction between participants represented by corresponding nodes. In block 704, the process simulates, using a plurality of stochastic simulations of changes to the collaborative network graph, integration of a new node into the collaborative network. In block 706, the process selects, as a best simulation, a simulation in the plurality of stochastic simulations producing a largest score improvement between a first score computed on the collaborative network graph and a second score computed on a second state of the collaborative network graph, the second state resulting from the simulation. In block 708, the process constructs, using a plurality of changes to the collaborative network graph included in the best simulation, an integration recommendation, a portion of the integration recommendation corresponding to a change in the plurality of changes. In block 710 the process implements the integration recommendation, by constructing a new edge in the collaborative network graph or adjusting a weight of an edge or a node in the collaborative network graph. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    constructing, using data of a plurality of interactions within a collaborative network, a collaborative network graph, wherein each node in the collaborative network graph represents a participant in an interaction in the plurality of interactions, wherein each edge in the collaborative network graph represents an interaction between participants represented by corresponding nodes;
    simulating, using a plurality of stochastic simulations of changes to the collaborative network graph, integration of a new node into the collaborative network;
    selecting, as a best simulation, a simulation in the plurality of stochastic simulations producing a largest score improvement between a first score computed on the collaborative network graph and a second score computed on a second state of the collaborative network graph, the second state resulting from the simulation; and
    constructing, using a plurality of changes to the collaborative network graph included in the best simulation, an integration recommendation, a portion of the integration recommendation corresponding to a change in the plurality of changes.

2. The computer-implemented method of claim 1, further comprising:
    implementing, by constructing a new edge in the collaborative network graph, the integration recommendation, the new edge connecting the new node and an existing node.

3. The computer-implemented method of claim 2, wherein the new edge represents a mentor-mentee relationship.

4. The computer-implemented method of claim 1, further comprising:
    implementing, by adjusting a weight of the new node in the collaborative network graph, the integration recommendation.

5. The computer-implemented method of claim 4, wherein the adjusted weight comprises an increased weight, the increased weight representing an increase in a skillset of a participant represented by the new node.

6. The computer-implemented method of claim 1, further comprising:
    implementing, by adjusting a weight of an edge connecting the new node and an existing node in the collaborative network graph, the integration recommendation.

7. A computer program product comprising one or more computer readable storage medium, and program instructions collectively stored on the one or more computer readable storage medium, the program instructions executable by a processor to cause the processor to perform operations comprising:
    constructing, using data of a plurality of interactions within a collaborative network, a collaborative network graph, wherein each node in the collaborative network graph represents a participant in an interaction in the plurality of interactions, wherein each edge in the collaborative network graph represents an interaction between participants represented by corresponding nodes;
    simulating, using a plurality of stochastic simulations of changes to the collaborative network graph, integration of a new node into the collaborative network;
    selecting, as a best simulation, a simulation in the plurality of stochastic simulations producing a largest score improvement between a first score computed on the collaborative network graph and a second score computed on a second state of the collaborative network graph, the second state resulting from the simulation; and
    constructing, using a plurality of changes to the collaborative network graph included in the best simulation, an integration recommendation, a portion of the integration recommendation corresponding to a change in the plurality of changes.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

10. The computer program product of claim 7, further comprising:
    implementing, by constructing a new edge in the collaborative network graph, the integration recommendation, the new edge connecting the new node and an existing node.

11. The computer program product of claim 10, wherein the new edge represents a mentor-mentee relationship.

12. The computer program product of claim 7, further comprising:
    implementing, by adjusting a weight of the new node in the collaborative network graph, the integration recommendation.

13. The computer program product of claim 12, wherein the adjusted weight comprises an increased weight, the increased weight representing an increase in a skillset of a participant represented by the new node.

14. The computer program product of claim 7, further comprising:

implementing, by adjusting a weight of an edge connecting the new node and an existing node in the collaborative network graph, the integration recommendation.

15. A computer system comprising a processor and one or more computer readable storage media, and program instructions collectively stored on the one or more computer readable storage media, the program instructions executable by the processor to cause the processor to perform operations comprising:
  constructing, using data of a plurality of interactions within a collaborative network, a collaborative network graph, wherein each node in the collaborative network graph represents a participant in an interaction in the plurality of interactions, wherein each edge in the collaborative network graph represents an interaction between participants represented by corresponding nodes;
  simulating, using a plurality of stochastic simulations of changes to the collaborative network graph, integration of a new node into the collaborative network;
  selecting, as a best simulation, a simulation in the plurality of stochastic simulations producing a largest score improvement between a first score computed on the collaborative network graph and a second score computed on a second state of the collaborative network graph, the second state resulting from the simulation; and
  constructing, using a plurality of changes to the collaborative network graph included in the best simulation, an integration recommendation, a portion of the integration recommendation corresponding to a change in the plurality of changes.

16. The computer system of claim 15, further comprising:
  implementing, by constructing a new edge in the collaborative network graph, the integration recommendation, the new edge connecting the new node and an existing node.

17. The computer system of claim 16, wherein the new edge represents a mentor-mentee relationship.

18. The computer system of claim 15, further comprising:
  implementing, by adjusting a weight of the new node in the collaborative network graph, the integration recommendation.

19. The computer system of claim 18, wherein the adjusted weight comprises an increased weight, the increased weight representing an increase in a skillset of a participant represented by the new node.

20. The computer system of claim 15, further comprising:
  implementing, by adjusting a weight of an edge connecting the new node and an existing node in the collaborative network graph, the integration recommendation.

* * * * *